(12) United States Patent
Mizuno et al.

(10) Patent No.: US 9,334,845 B2
(45) Date of Patent: May 10, 2016

(54) ENGINE STARTING DEVICE

(71) Applicant: Mitsubishi Electric Corporation, Chiyoda-ku, Tokyo (JP)

(72) Inventors: Daisuke Mizuno, Tokyo (JP); Akihiko Imagi, Tokyo (JP); Hiroaki Kitano, Tokyo (JP); Koichiro Kamei, Tokyo (JP); Kazuhiro Odahara, Tokyo (JP); Masami Abe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/915,000

(22) Filed: Jun. 11, 2013

(65) Prior Publication Data

US 2014/0060247 A1 Mar. 6, 2014

(30) Foreign Application Priority Data

Aug. 29, 2012 (JP) .................. 2012-188867

(51) Int. Cl.
*F02N 15/06* (2006.01)
*F02N 11/02* (2006.01)
*F02N 11/08* (2006.01)

(52) U.S. Cl.
CPC ............ *F02N 11/02* (2013.01); *F02N 11/0844* (2013.01); *F02N 11/0855* (2013.01); *F02N 15/067* (2013.01); *Y02T 10/48* (2013.01); *Y10T 74/132* (2015.01)

(58) Field of Classification Search
CPC . F16H 55/08; F16H 55/0873; F16H 55/0886; F16H 55/16; F02N 15/06; F02N 11/0855; F02N 11/0851

USPC ................ 74/6, 7 R, 457, 460, 462, 8, 7 C
See application file for complete search history.

(56) References Cited

U.S. PATENT DOCUMENTS 1,258,303 A     3/1918   Bendix
1,329,535 A *   2/1920   McGrath ...................... 74/462

(Continued)

FOREIGN PATENT DOCUMENTS

DE        102008054979 A1    6/2010
DE    10 2010 038 443 A1    2/2012

(Continued)

OTHER PUBLICATIONS

German Office Action, dated Apr. 8, 2014, Application No. 10 2013 213 084.8.

(Continued)

*Primary Examiner* — William Kelleher
*Assistant Examiner* — Jake Cook
(74) *Attorney, Agent, or Firm* — Sughrue Mion, PLLC (57) ABSTRACT

The engine starting device includes a pinion unit which is spline-coupled to an output shaft side of a starter motor to slide in an axial direction, the pinion unit including a one-way clutch which spins for rotation in the same direction as that of rotation of the engine, and a pushing mechanism for moving the pinion unit to a position in which the pinion unit comes into meshing engagement with a ring gear. A pinion gear of the pinion unit is movable in the axial direction as a single body, and includes a chamfered portion having a curved surface along a tooth surface on a non-torque transmitting surface side and a large length in the axial direction, the chamfered portion being provided to a ring-gear side distal end portion of the tooth surface on the non-torque transmitting surface side.

5 Claims, 7 Drawing Sheets

(56) References Cited

U.S. PATENT DOCUMENTS

| | | | |
|---|---|---|---|
| 1,491,481 A * | 4/1924 | Huetter | 74/401 |
| 5,953,956 A * | 9/1999 | Morimoto | 74/7 A |
| 7,389,708 B2 * | 6/2008 | Kajino | 74/7 E |
| 2003/0101833 A1 * | 6/2003 | Monroe et al. | 74/7 R |
| 2010/0236360 A1 * | 9/2010 | Gomez et al. | 74/7 C |
| 2010/0269631 A1 * | 10/2010 | Niimi et al. | 74/7 E |
| 2013/0091967 A1 * | 4/2013 | Seillier et al. | 74/6 |

FOREIGN PATENT DOCUMENTS

| | | |
|---|---|---|
| JP | 2002-70699 A | 3/2002 |
| JP | 2002-250428 A | 9/2002 |
| JP | 2006-132343 A | 5/2006 |
| JP | 2009-168230 A | 7/2009 |
| JP | 2010-255590 A | 11/2010 |
| JP | 2012512982 A | 6/2012 |
| WO | 2010069646 A1 | 6/2010 |
| WO | 2012077501 A1 | 6/2012 |

OTHER PUBLICATIONS

Japanese Office Action (Preliminary Notice of Reasons for Rejection) dated Feb. 12, 2014, Patent Application No. 2012-188867.

Japanese Office Action dated Sep. 30, 2014 issued in corresponding Japanese Patent Application No. 2012-188867.

Communication dated Dec. 17, 2015, issued by the German Patent Office in counterpart German Application No. 102013213084.8.

* cited by examiner

ENGINE STARTING DEVICE

BACKGROUND OF THE INVENTION

1. Field of the Invention

The present invention relates to an engine starting device including a mechanism for shortening, when a restart request for an engine is issued while the engine is still rotating by inertia immediately after idle stop, a restart time by bringing a pinion gear into meshing engagement with a ring gear of the engine without rotating a starter motor for the pinion gear during rotation of the ring gear even in the case where the rotation of the ring gear is in a reverse direction.

2. Description of the Related Art

In a conventional engine starting device (hereinafter referred to as starter), a start operation is carried out while an engine is stopped. Thus, a pinion gear meshes with a ring gear while the ring gear is not rotating. However, in a system for carrying out idle stop for reducing fuel consumption, a restarting property is secured by meshing the pinion gear with the ring gear even when the ring gear is rotating.

For example, at the moment when the idle stop is just started and the engine is not stopped yet, if a restart is requested, or if it is necessary to reduce a period for a restart from a stop state, while the ring gear is rotating, the ring gear is meshed in advance with the pinion gear.

As described above, as a method of meshing the pinion gear with the ring gear while the ring gear is rotating, there is known a method of meshing the pinion gear by supplying an electric power to thereby adjust the speed of the starter motor of the pinion gear so that the pinion gear is synchronized with the RPM of the ring gear (for example, refer to Japanese Patent Application Laid-open No. 2002-70699). Moreover, there is known a method of carrying out, by providing a mechanism for synchronization in advance, synchronization up to a predetermined difference in RPM by friction of a portion of the mechanism, and then meshing gears with each other (for example, refer to Japanese Patent Application Laid-open No. 2006-132343). Further, there is known a method of facilitating the meshing by devising the pinion shape (for example, refer to Japanese Patent Application Laid-open No. 2009-168230).

However, the conventional technologies have the following problems.

The ring gear decelerates while rotating by inertia after the engine stops, and in this case, the RPM becomes zero while pulsating due to a fluctuation in torque caused by compression and expansion by pistons. Thus, for example, as described in Japanese Patent Application Laid-open No. 2002-70699, for synchronizing the RPMs of the ring gear and the pinion gear with each other by the engine starting device (starter), thereby meshing those gears with each other, a complex configuration is necessary. Specifically, there is a need for a complex configuration for acquiring or predicting the RPMs of the ring gear and the pinion gear, and, based thereon, for controlling the starter to mesh the ring gear and the pinion gear with each other.

In the complex configuration, the timing to push the pinion gear and the timing to start rotating the pinion gear are important. Even after the rotation of the pinion gear is started, however, it takes a long period of time for an RPM of the pinion gear to increase up to a predetermined RPM. Further, it also takes a predetermined period of time to bring the pinion gear into meshing engagement with the ring gear by pushing the pinion gear. Further, the predetermined period of time is varied. Therefore, the meshing engagement between the pinion gear and the ring gear by rotating the pinion gear in synchronization with an engine RPM is practically difficult to achieve with a simple system.

Moreover, when a speed of decelerated rotation of the engine is high, the increase in RPM of the pinion gear cannot follow the speed of rotation of the engine. Thus, at the time when the pinion gear is pushed to come into contact with the ring gear, there arises a phenomenon in which the ring gear rotates in a reverse direction. In the case where the reverse-rotation phenomenon occurs, a direction of the rotation of the motor is required to be reversed. Therefore, a motor system and control for the motor rotation become complicated, and therefore are difficult to realize.

Further, during a period in which the engine is decelerating while rotating by inertia with pulsations, the engine starts rotating in the reverse direction depending on a piston position immediately before the engine is stopped. In order to cause the pinion gear to follow the reverse rotation, the motor is required to be rotated in the reverse direction. Even in this case, performance and control of the motor itself become complicated, and therefore are difficult to realize with a simple system.

In view of the variation which actually occurs as described above, the RPMs for meshing engagement can be brought into synchronization to achieve the meshing engagement only under certain limited conditions.

On the other hand, for example, as described in Japanese Patent Application Laid-open No. 2006-132343, by providing a configuration in which the pinion gear and the ring gear are synchronized in RPM by a synchronization mechanism in advance to be then brought into contact with each other, the ring gear and the pinion gear can be synchronized with each other in RPM by a simpler configuration. However, a gear ratio of the pinion gear to the ring gear is generally present at a level of ten times for reducing the size of the motor, and the pinion gear and the ring gear are not arranged coaxially due to a restriction in terms of a dimensional configuration.

Thus, the synchronization is carried out while a friction surface of the synchronization mechanism for bringing the pinion gear into contact with the ring gear is always slipping, and it is difficult to realize a complete synchronization in which the phases are matched as well. Therefore, the meshing engagement is difficult in the reverse direction, and hence there is a need to take appropriate measures, such as prohibition through control.

Moreover, in the synchronization mechanism, when the ring gear and the pinion gear are in contact with each other after the synchronization, except for a case where the phases are matched with each other by chance, a slip is generated between the ring gear and the pinion gear, and the ring gear and the pinion gear mesh with each other when the phases thereof are matched. In this way, in the configuration employing the synchronization mechanism, after the synchronization is realized by the slip, the pinion gear and the ring gear are brought into contact with each other.

As a result, there are a problem of noises and wear upon the contact and a problem in that a friction surface is additionally necessary for the synchronization, resulting in requirement of an additional space. Also in view of the configuration, the space becomes larger than that for the conventional pinion gear and ring gear, and therefore it is difficult to realize the simple meshing engagement.

Therefore, as a method of simply meshing the pinion gear and the ring gear with each other, for example, in a case where the synchronization mechanism is used, as described in Japanese Patent Application Laid-open No. 2009-168230, in order to facilitate the meshing between the pinion gear and the ring gear, it is conceivable to devise a shape of ends of the pinion gear, thereby providing a chamfer or the like on the tooth end. As a result, according to Japanese Patent Application Laid-open No. 2009-168230, a space portion realized by the chamfering can be inserted, and a guiding effect by the surface contact is realized.

On this occasion, according to Japanese Patent Application Laid-open No. 2009-168230, for the meshing in a state in which the ring gear is stopped, the guiding effect by the chamfering is provided. However, in a case where a relative RPM of the pinion gear is different while the ring gear is rotating, a collision of both the gears as a result of the contact of the chamfered portions generates a force component of pushing back the pinion gear in the axial direction. Therefore, the chamfer is disadvantageous in the case where the ring gear is rotating.

In this way, when the pinion gear is meshed while the ring gear is rotating, the noises, a decrease in service life due to wear, and the delay in starting which is caused by a loss in the meshing time occur unless more secure synchronization and phase matching are carried out at the moment of the contact.

Particularly, in a case where the RPM difference is large when the pinion gear and the ring gear mesh with each other, when the teeth are rubbed against each other for a long period of time without synchronization, the noise level becomes higher.

SUMMARY OF THE INVENTION

The present invention has been made to solve the problems described above, and therefore has an object to provide an engine starting device capable of easily bringing a pinion gear into meshing engagement with a ring gear to restart an engine while the ring gear is rotating regardless of whether the rotation of the ring gear is in a forward direction or a reverse direction even when a difference in RPM between the ring gear and the pinion gear is large.

According to an exemplary embodiment of the present invention, there is provided an engine starting device, including: a starter motor; a pinion unit which is spline-coupled to an output shaft side of the starter motor to slide in an axial direction, the pinion unit including a one-way clutch which spins for rotation in the same direction as a direction of rotation of an engine; a pushing mechanism for moving the pinion unit to a position in which the pinion unit comes into meshing engagement with a ring gear; and the ring gear to be brought into meshing engagement with a pinion gear of the pinion unit pushed by the pushing mechanism, the ring gear being configured to start the engine by transmission of a rotating force of the starter motor thereto, the engine starting device being configured to perform restart based on a predetermined condition when a restart request is issued while the engine is rotating by inertia after the engine is stopped, in which the pinion gear of the pinion unit is operable in the axial direction as a single body, and includes a chamfered portion having a curved shape along a tooth surface on a non-torque transmitting surface side, the chamfered portion being provided between an end surface of the pinion gear on the ring gear side and the tooth surface on the non-torque transmitting surface side.

According to the engine starting device of the present invention, the pinion gear operable in the axial direction as a single body is used, and the chamfered portion having the curved shape along the tooth surface on the non-torque transmitting surface side is provided between the end surface of the pinion gear on the ring gear side and the tooth surface on the non-torque transmitting surface side. As a result, it is possible to obtain the engine starting device capable of easily bringing the pinion gear into meshing engagement with the ring gear to restart the engine while the ring gear is rotating regardless of whether the rotation of the ring gear is in the forward direction or the reverse direction even when the difference in RPM between the ring gear and the pinion gear is large.

DETAILED DESCRIPTION OF THE PREFERRED EMBODIMENT

In the following, an engine starting device according to an exemplary embodiment of the present invention is described referring to the drawings.

First Embodiment

Figure 1:
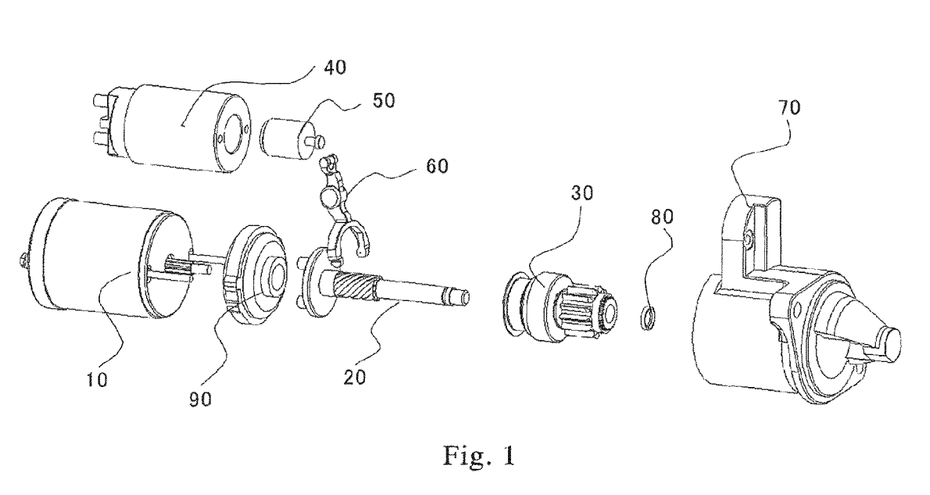
FIG. 1 is an exploded view of an engine starting device according to a first embodiment of the present invention.

FIG. 1 is an exploded view of an engine starting device according to a first embodiment of the present invention. The engine starting device according to the first embodiment illustrated in FIG. 1 includes a motor drive unit 10, a shaft 20, a pinion unit 30, an attraction coil unit 40, a plunger 50, a lever 60, a bracket 70, a stopper 80, and a speed reduction gear unit 90.

The motor drive unit 10 starts an engine. The shaft 20 is coupled via the speed reduction gear unit 90 to an output shaft side of the motor. The pinion unit 30 is integrated with an overrunning clutch coupled to the shaft 20 by means of a helical spline, and can slide in an axial direction.

The attraction coil unit 40 attracts the plunger 50 by turning on a switch. The lever 60 transmits a travel of the plunger 50 by the attraction to the pinion unit 30. The bracket 70 fixes the respective components including the motor drive unit 10, the shaft 20, and the pinion unit 30 via the stopper 80 to the engine side when the pinon gear travels.

Figure 2:
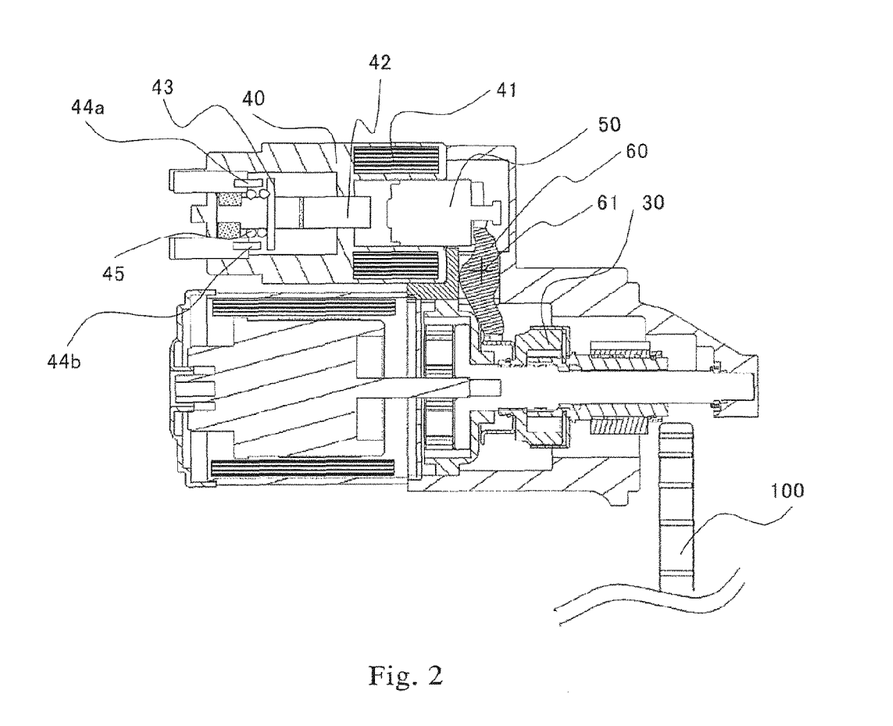
FIG. 2 is a cross sectional view illustrating a state in which the engine starting device according to the first embodiment of the present invention is installed on an engine.

FIG. 2 is a cross sectional view illustrating a state in which the engine starting device according to the first embodiment of the present invention is installed on the engine. In a case where the engine is to be started, when the switch is turned on, a relay contact closes and a current flows through an attraction coil 41 of the attraction coil unit 40. Accordingly, the plunger 50 is attracted. When the plunger 50 is attracted, the lever 60 is pulled in, and the lever 60 rotates about a lever rotation axial center 61.

In the rotated lever 60, an end portion on the opposite side of the plunger 50 pushes out the pinion unit 30 and, as a result, the pinion unit 30 is pushed out along the spline of the shaft 20 while rotating. The plunger 50 is further attracted to press a core 42 while compressing a spring 45. As a result, motor contacts 44a and 44b are closed by a movable contact portion 43 to start the energization of a driving motor, thereby rotating the motor.

Figure 3:
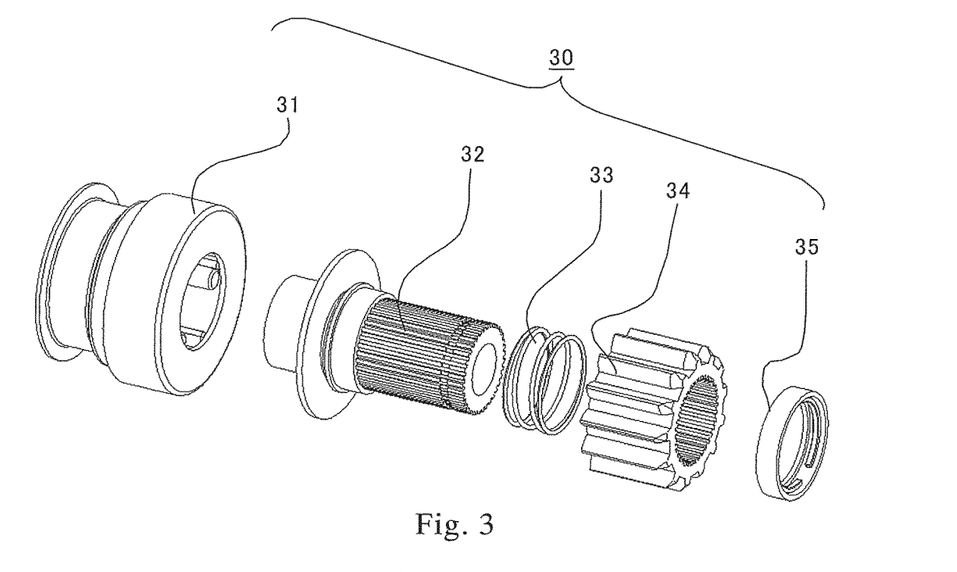
FIG. 3 is an exploded perspective view of components of a pinion unit according to the first embodiment of the present invention.

FIG. 3 is an exploded perspective view of components of the pinion unit 30 according to the first embodiment of the present invention. The pinion unit 30 includes an overrunning clutch 31, a shaft core 32, a coil spring 33, a pinion gear 34, and a retaining component 35.

Figure 4:
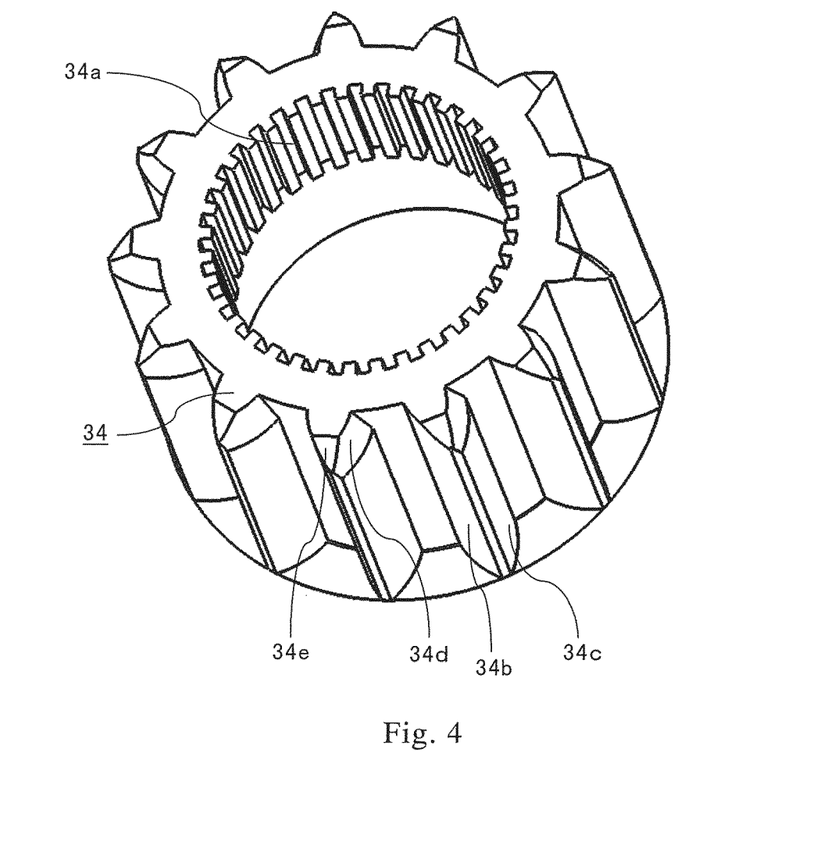
FIG. 4 is a perspective view illustrating a shape of a pinion gear according to the first embodiment of the present invention.

FIG. 4 is a perspective view illustrating a shape of the pinion gear 34 according to the first embodiment of the present invention. As illustrated in FIG. 4, a chamfered portion 34d is provided as a curved shape along a tooth surface corresponding to a surface 34c on a non-torque transmitting side between an end surface of the pinion gear 34 on a ring gear 100 side and the surface 34c. Further, a chamfered portion 34e is provided to an outer diameter portion of each tooth tip of the pinion gear 34 along an outer diameter of the tooth tip.

Figure 6:
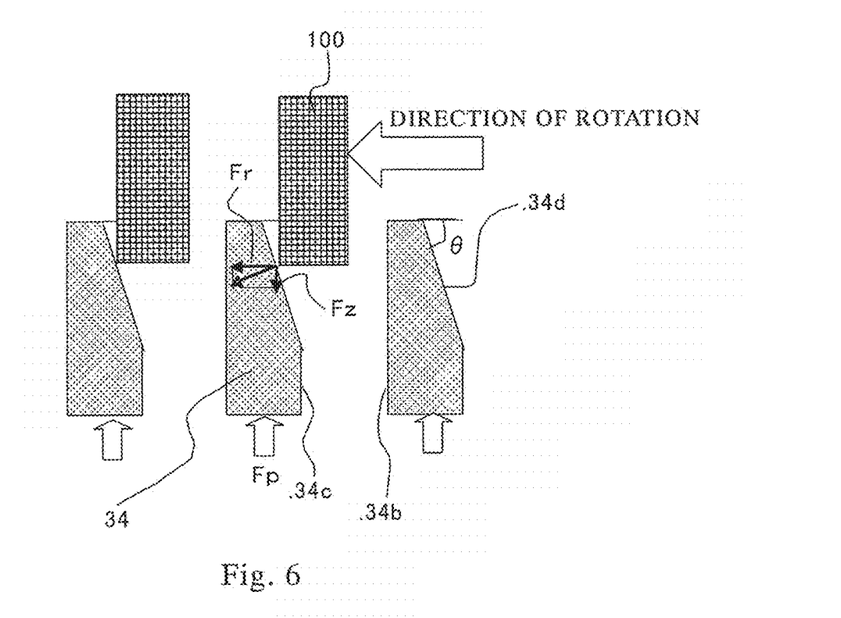
FIG. 6 is an image diagram different from FIG. 5, for illustrating the state in which the pinion gear is pushed to be brought into meshing engagement with the ring gear while the ring gear is rotating in the forward direction according to the first embodiment of the present invention.

For sizes of the chamfered portion 34d in the axial direction and a direction of rotation, as described later with reference to FIGS. 6 and 8A to 8D, the curved shape is formed so that the size of the chamfered portion 34d in the axial direction (corresponding to a vertical direction on the drawing sheet of FIGS. 6 and 8A to 8D) becomes equal to or larger than the size of the chamfered portion 34d in the direction of rotation (corresponding to a horizontal direction on the drawing sheet of FIGS. 6 and 8A to 8D) (in other words, an angle θ illustrated in FIG. 6 is increased to achieve a chamfered shape having a large axial length). Further, grooves 34a for meshing engagement with the shaft core 32 are provided on the inner side of the pinion gear 34.

With the configuration described above, when a restart request is issued while the ring gear 100 is rotating by inertia after the engine is stopped, the relay contact is closed to energize the attraction coil 41. In this manner, the pinion gear 34 can be pushed to be brought into contact with the ring gear 100.

Figure 5:
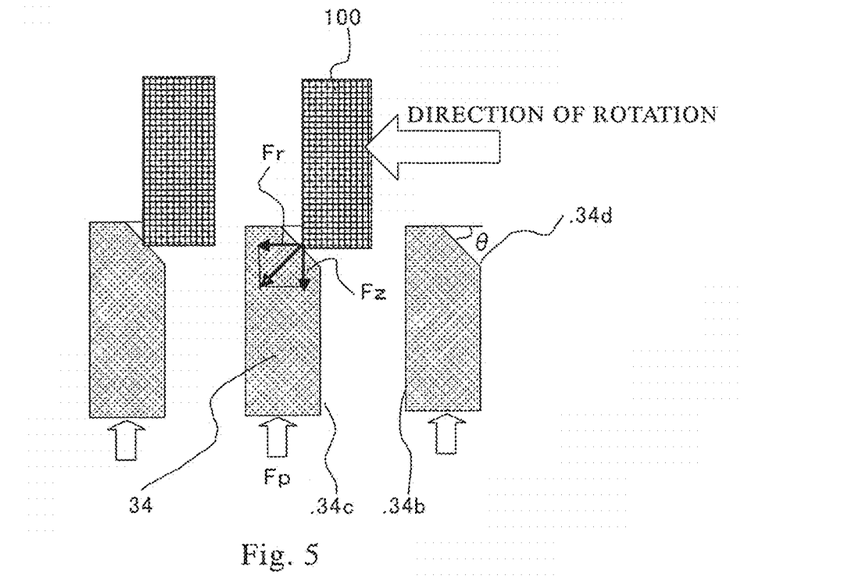
FIG. 5 is an image diagram illustrating a state in which the pinion gear is pushed to be brought into meshing engagement with a ring gear while the ring gear is rotating in a forward direction according to the first embodiment of the present invention.

FIG. 5 is an image diagram illustrating a state in which the pinion gear 34 is pushed to be brought into meshing engagement with the ring gear 100 while the ring gear 100 is rotating in a forward direction according to the first embodiment of the present invention. More specifically, FIG. 5 exemplifies the case where the ring gear 100 and the chamfered portion 34d come into contact with each other in a meshing-engagement operation performed while the ring gear 100 is rotating in the forward direction.

When the ring gear 100 and the chamfered portion 34d come into contact with each other as illustrated in FIG. 5, a force for spinning the overrunning clutch 31 in a spinning direction is generated as a force to be transmitted to the pinion gear 34 by the rotation of the ring gear 100.

Therefore, the overrunning clutch 31 also functions to achieve the synchronization of the rotations when the ring gear 100 rotates at a high speed. The chamfered portion 34d is formed as a curved surface along the tooth surface corresponding to the surface 34c on the non-torque transmitting side. Therefore, a state as viewed on a cross section perpendicular to the axial direction is equivalent to a state in which the teeth of the ring gear 100 and the teeth of the pinion gear 34 are always in meshing engagement with each other. Specifically, a rotation loss is generated.

When the state is not equivalent to the state in which the teeth are in meshing engagement with each other, a speed vector of the teeth of the ring gear 100 and that of the teeth of the pinion gear 34 differ from each other. Therefore, as a result, the position, at which one of the teeth of the ring gear 100 and a corresponding one of the teeth of the pinion gear 34 are in contact with each other, is varied in the axial direction. Therefore, a stable rotating force is not transmitted, and further, a reaction force is sometimes generated. As a result, the state becomes unstable.

Therefore, when a minimum necessary force in the direction of rotation to obtain the stable rotating force is Fr and a chamfering angle of the chamfered portion 34d is θ, a reaction force Fz in the axial direction, which is generated with respect to the minimum necessary force Fr for the stable rotating force, is expressed by the relationship:

$$Fz = Fr/\tan\theta \quad (1)$$

Therefore, when the force Fz has the relationship:

$$Fp > Fz \quad (2)$$

with respect to a force Fp for pushing the pinion gear, the pinion gear 34 can be pushed against the ring gear 100 while the rotation of the pinion gear 34 and the rotation of the ring gear 100 are brought into synchronization with each other.

When the force Fp for pushing the pinion gear 34 is large, good meshing performance is obtained. However, when the force Fp is too large, a load generated at the time of collision between the pinion gear 34 and the ring gear 100 is increased, resulting in increased wear. Therefore, it is appropriate that the force Fp for pushing the pinion gear 34 be set to an optimal load without being set larger than needed. In the structure of the first embodiment, the force Fp means a press force by the coil spring 33.

Therefore, in order to reduce the force Fz as much as possible, the angle θ is required to be set large. FIG. 6 is an image diagram different from FIG. 5, for illustrating the state in which the pinion gear 34 is pushed to be brought into meshing engagement with the ring gear 100 while the ring gear 100 is rotating in the forward direction according to the first embodiment of the present invention. More specifically, FIG. 6 illustrates the case where the angle θ is set larger than that of the above-mentioned case illustrated in FIG. 5.

The increase of the angle θ corresponds to, in other words, the chamfered portion 34d provided as follows. Specifically, the chamfered portion 34d is provided so that the size of the chamfered portion 34d in the axial direction becomes equal to or larger than that in the direction of rotation (specifically, so that the chamfered portion 34d has a chamfered shape with a larger length in the axial direction as illustrated in FIG. 6).

By increasing the angle θ as illustrated in FIG. 6, the force Fz becomes smaller. Therefore, a spring reaction force, which is larger than the reduced force Fz, is sufficient as the force Fp. Specifically, by increasing the angle θ, the rotation of the pinion gear 34 can be instantaneously brought into synchronization with the rotation of the ring gear 100 even while the ring gear 100 is rotating so that the pinion gear 34 is brought into meshing engagement with the ring gear 100.

FIGS. 7A to 7D are image diagrams illustrating a state in which the pinion gear 34 is pushed to be brought into meshing engagement with the ring gear 100 while the ring gear 100 is rotating in a reverse direction due to pulsations according to the first embodiment of the present invention. As illustrate in FIGS. 7A to 7D, the pinion gear 34 is pushed against the ring gear 100 along the chamfered portion 34d along with the rotation of the ring gear 100 (see FIGS. 7A and 7B). As a result, the ring gear 100 and a torque transmitting surface 34b are brought into meshing engagement with each other as an initial meshing-engagement state (see FIG. 7C).

When the torque transmitting surface 34b comes into contact with the ring gear 100 to rotate the pinion gear 34 in the reverse direction, the pinion unit 30 is pulled by a helical gear (not shown) to achieve the full meshing engagement. Then, by the full meshing engagement, a length 36b on the torque transmitting surface 34b (torque-transmitting meshing-engagement length) is ensured (see FIG. 7D).

Figure 7:
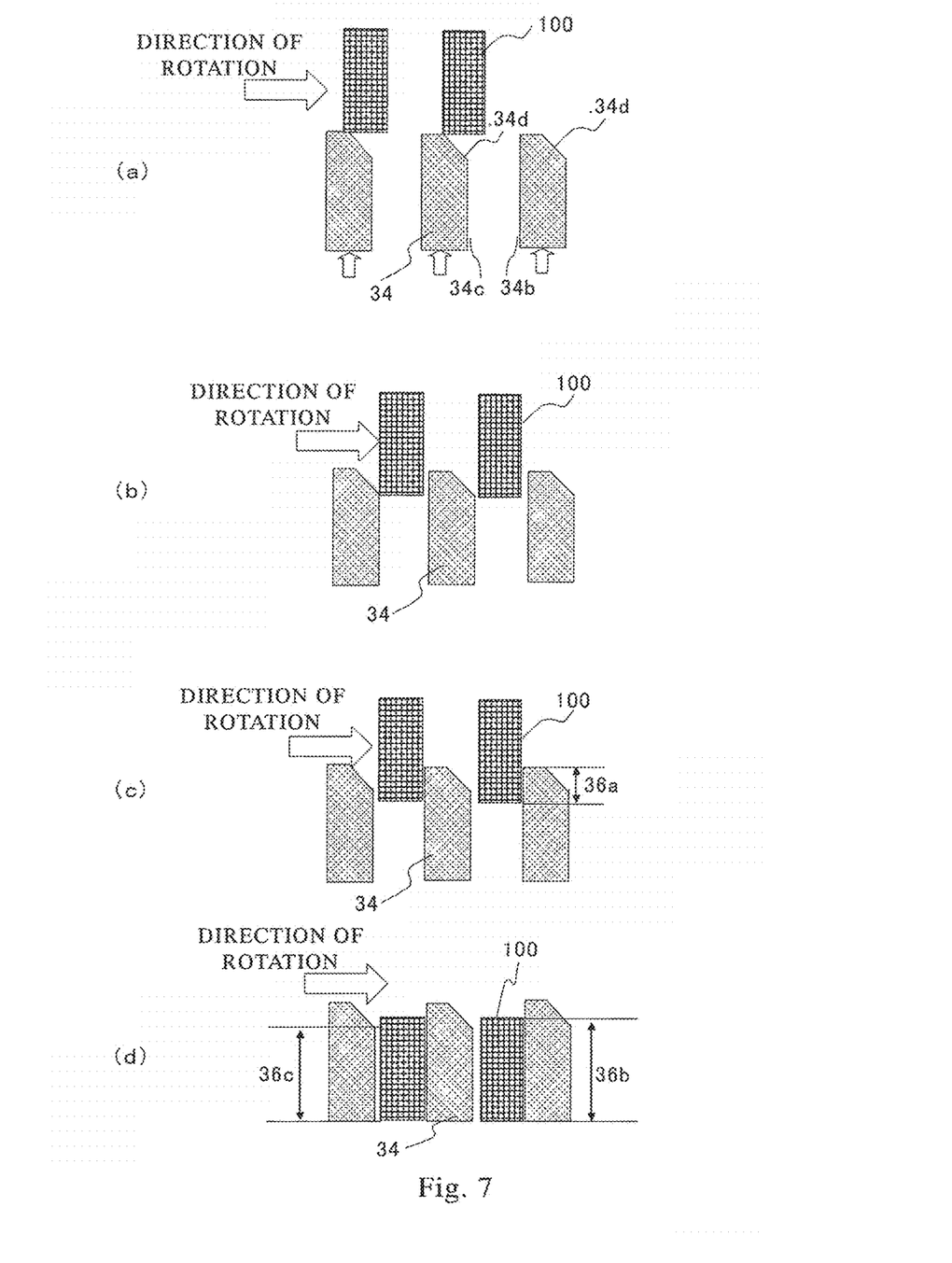
FIGS. 7A to 7D are image diagrams illustrating a state in which the pinion gear is pushed to be brought into meshing engagement with the ring gear while the ring gear is rotating in a reverse direction due to pulsations according to the first embodiment of the present invention.

At this time, a supposed length of the surface 34c on the non-torque transmitting side, over which the ring gear 100 is held in contact, is a length 36c. Specifically, the surface 34c corresponds to a surface remaining as the surface on the non-torque transmitting side after the chamfered portion 34d is provided, and serves as a surface against which the ring gear 100 abuts at the time of cranking performed with the pulsations of the ring gear 100 when the motor is rotated to start the engine. An axial length of the surface 34c on the non-torque transmitting side (non-torque transmitting surface collision length) at the time of collision is the length 36c.

In the operation described above, an initial meshing-engagement length 36a is important. If the initial meshing-engagement length 36a is not ensured, the ring gear 100 is adversely worn away. Therefore, by increasing the axial length of the chamfered portion 34d, the longer initial meshing-engagement length 36a can be ensured.

FIGS. 8A to 8D are image diagrams different from FIGS. 7A to 7D, for illustrating the state in which the pinion gear 34 is pushed to be brought into meshing engagement with the ring gear 100 while the ring gear 100 is rotating in the reverse direction due to pulsations according to the first embodiment of the present invention. More specifically, FIGS. 8A to 8D correspond to the case where the angle θ is set larger than that in the above-mentioned case illustrated in FIGS. 7A to 7D.

Figure 8:
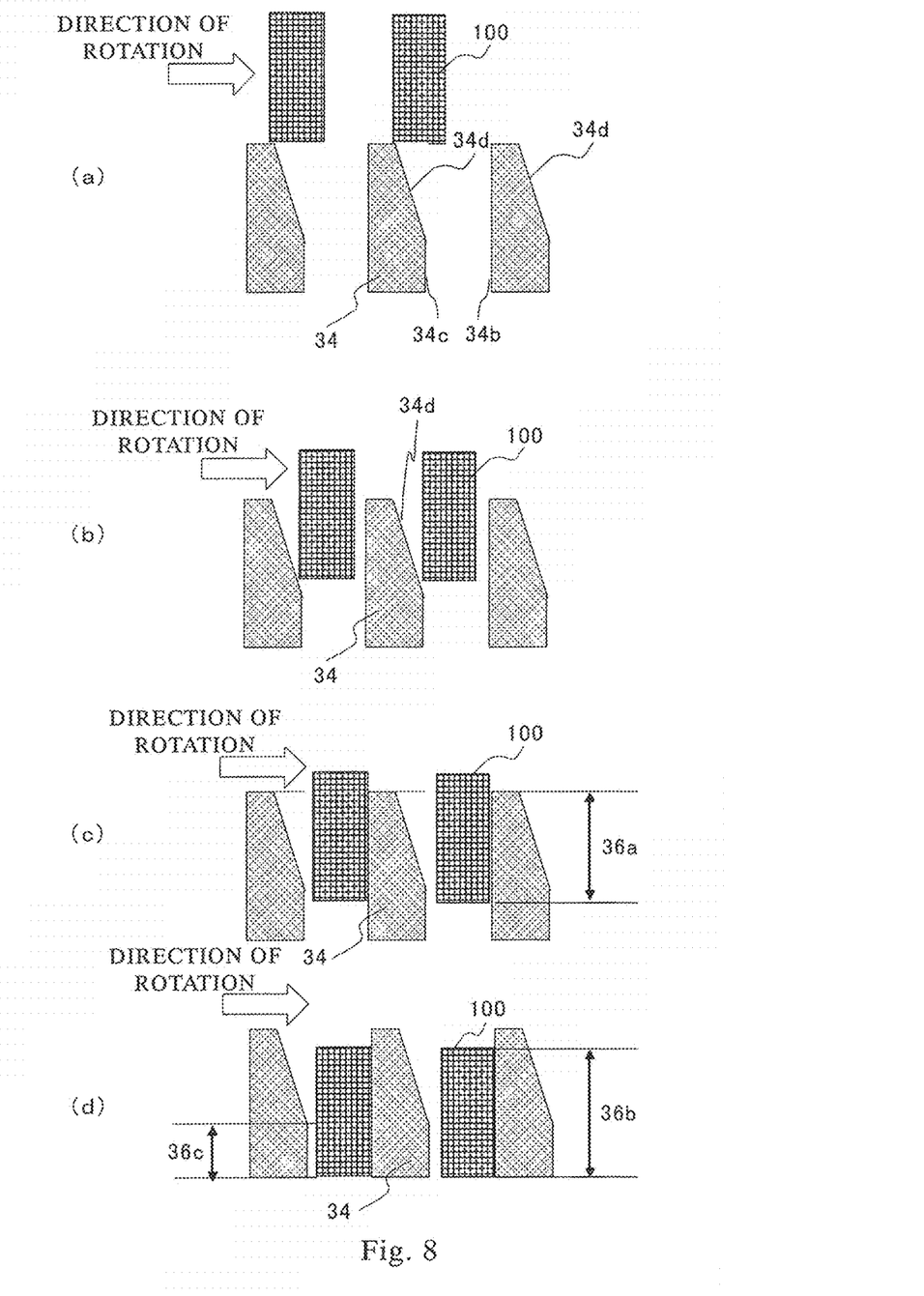
FIGS. 8A to 8D are image diagrams different from FIGS. 7A to 7D, for illustrating the state in which the pinion gear is pushed to be brought into meshing engagement with the ring gear while the ring gear is rotating in the reverse direction due to pulsations according to the first embodiment of the present invention.

As illustrated in FIGS. 8A to 8D, the pinion gear 34 comes into contact with the end surface of the ring gear 100 at the initial collision (see FIG. 8A), is introduced along the chamfered portion 34d (see FIG. 8B), and is brought into meshing engagement with the ring gear 100 over the initial meshing-engagement length 36a (see FIG. 8C). The axial length of the chamfered portion 34d is increased by increasing the angle θ. As a result, the large initial meshing-engagement length 36a can be ensured.

Besides the ensuring of the initial meshing-engagement length 36a, another important point resides in a structure in which the pinion gear 34 can be moved as a single body. The pinion unit 30 is heavy because the pinion unit 30 is moved as the combination of components including the overrunning clutch 31.

On the other hand, in the structure of the pinion unit 30 according to the first embodiment, the pinion gear 34 can be operated as a single body. In this case, a moved mass is only a mass of the pinion gear 34. Therefore, acceleration can be performed at a higher speed. Thus, the meshing engagement along the chamfered portion 34d can be achieved. Accordingly, for the pinion gear 34 having a small mass, only a pushing force for allowing the pinion gear 34 to be pushed along the surface of the chamfered portion 34d is sufficient. The pushing force in this case is a press load by the coil spring 33.

The torque transmission can be performed even after the achievement of the meshing engagement between the pinion gear 34 and the ring gear 100 as long as the torque-transmitting meshing-engagement length 36b is ensured. Although the length 36c of the surface 34c on the non-torque transmitting side becomes shorter in this case, there is no problem as long as the length 36c is at the minimum level, which does not cause excessive wear. In other words, the chamfered portion 34d is formed on the surface 34c on the non-torque transmitting side so that the axial length 36c of the surface 34c on the non-torque transmitting side remains at the minimum level in a state in which the pinion gear 34 is held in full meshing engagement with the ring gear 100 (corresponding to FIG. 8D).

As described above, the coil spring 33 only needs to be designed so that a spring load allows the generation of the necessary press force of the spring in the case where the ring gear 100 rotates in the forward direction and the generation of the pushing force for pushing the pinion gear 34 along the chamfered portion 34d in the case where the ring gear 100 rotates in the reverse direction. With the design described above, when the pinion gear 34 is to be brought into meshing engagement with the ring gear 100 while the ring gear 100 is rotating, the ring gear 100 and the pinion gear 34 can be easily brought into meshing engagement with each other to restart the engine even in the case where a difference in RPM between the ring gear 100 and the pinion gear 34 is large.

When the chamfering angle θ of the chamfered portion 34d is desired to be increased, not only the size of the chamfered portion 34d in the axial direction but also the size in a circumferential direction (direction of rotation) may be increased. In this case, however, if the size in the circumferential direction is increased to be excessively large, the strength of the teeth themselves becomes insufficient. Even in this case, by forming the chamfered portion 34d to have the curved surface along the tooth surface corresponding to the surface 34c on the non-torque transmitting side, the chamfering can be performed in a state in which a thickness of the teeth of the pinion gear 34 is left as much as possible.

Figure 9:
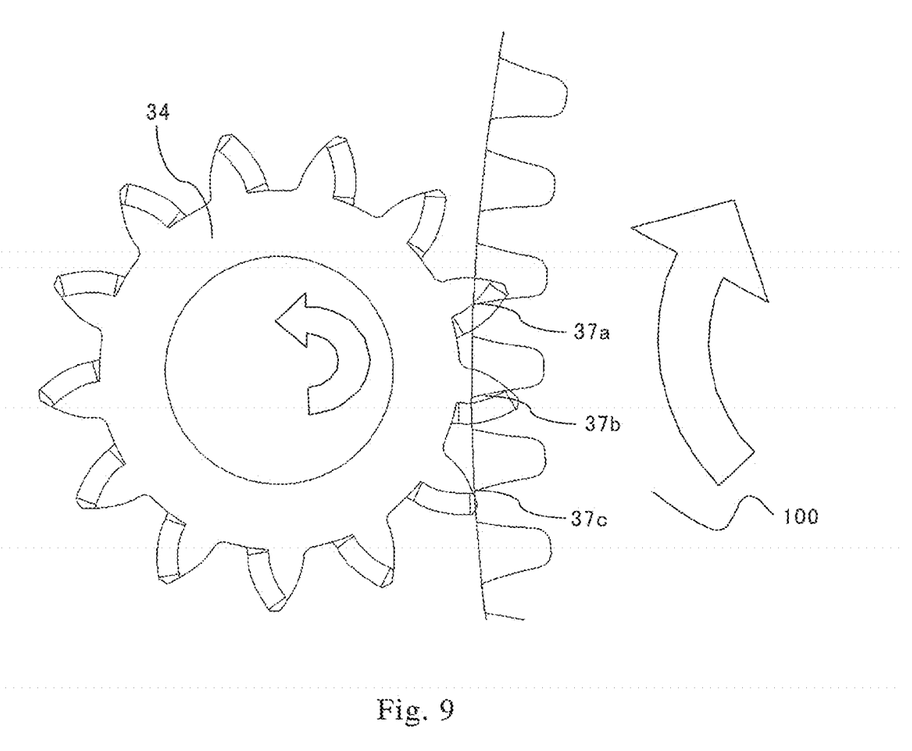
FIG. 9 is a diagram illustrating a relative positional relationship between the pinion gear and the ring gear according to the first embodiment of the present invention.

FIG. 9 is a diagram illustrating a relative positional relationship between the pinion gear 34 and the ring gear 100 according to the first embodiment of the present invention. As illustrated in FIG. 9, at the time of meshing engagement, points, at which the ring gear 100 and the pinion gear 34 overlap in terms of the positional relationship therebetween, are overlapping portions 37a, 37b, and 37c. Among the overlapping portions 37a, 37b, and 37c, it is at the overlapping portion 37b that the ring gear 100 and the pinion gear 34 are actually in contact with each other.

In the structure of the first embodiment, however, the pinion gear 34 and the ring gear 100 sometimes come into contact with each other at the overlapping portion 37c depending on accuracy of the shaft core for the pinion gear 34 or due to the inclination depending on working accuracy of the pinion gear 34. In this case, an outer portion of the ring gear 100 and an edge portion of the pinion gear 34 come into contact with each other, and hence the tooth tip interferes. As a result, the pinion gear 34 and the ring gear 100 cannot rotate.

Figure 10:
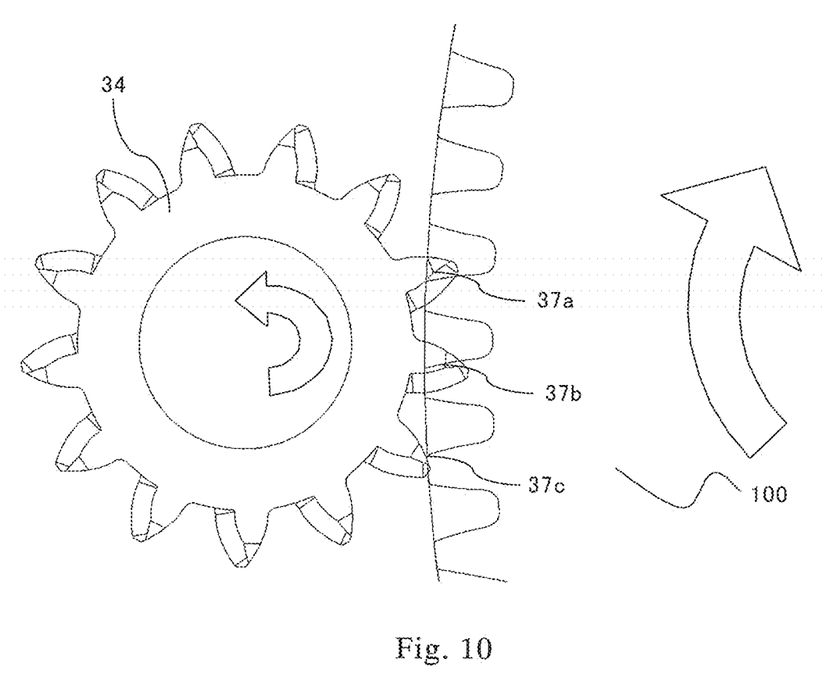
FIG. 10 is a diagram different from FIG. 9, for illustrating the relative positional relationship between the pinion gear and the ring gear according to the first embodiment of the present invention.

In order to avoid the state described above, it is effective to provide the chamfered portion 34e on the outer diameter portion of the tooth tip of the pinion gear 34 as illustrated in FIG. 4 referred to above. FIG. 10 is a diagram different from FIG. 9, for illustrating the relative positional relationship between the pinion gear 34 and the ring gear 100 according to the first embodiment of the present invention. As illustrated in FIG. 10, by providing the chamfered portion 34e to the outer diameter portion of the tooth tip, the pinion gear 34 and the ring gear 100 can be brought into contact with each other without fail at the overlapping portion 37b or 37a.

By adopting the configuration described above, the ring gear 100 and the pinion gear 34 can be instantaneously brought into meshing engagement with each other to start the motor. Moreover, by forming the curved surfaces of the pinion gear 34 by forging, cost can be lowered.

As described above, in the structure according to the first embodiment, the pinion gear can be operated in the axial direction as a single body. Further, the chamfered portion having the curved shape along the tooth surface is provided between the end surface of the pinion gear on the ring gear side and the tooth surface on the non-torque transmitting side. With the structure described above, it is possible to realize the engine starting device capable of easily bringing the pinion gear into meshing engagement with the ring gear to restart the engine while the ring gear is rotating regardless of whether the rotation of the ring gear is in the forward direction or the reverse direction even when the difference in RPM between the ring gear and the pinion gear is large.

Further, the chamfered portion has the shape with the large length in the axial direction. As a result, the pinion gear can be moved with a smaller press force, and the longer initial meshing-engagement length can be ensured. As a result, the meshing performance can be further improved.

What is claimed is:

1. An engine starting device, comprising:
   a starter motor;
   a pinion unit which is spline-coupled to an output shaft side of the starter motor to slide in an axial direction, the pinion unit comprising a one-way clutch which spins for rotation in the same direction as a rotation direction of an engine;
   a pushing mechanism for moving the pinion unit to a position in which the pinion unit comes into meshing engagement with a ring gear; and
   the ring gear to be brought into meshing engagement with a pinion gear of the pinion unit pushed by the pushing mechanism, the ring gear being configured to start the engine by transmission of a rotating force of the starter motor thereto,
   the engine starting device being configured to perform restart based on a predetermined condition when a restart request is issued while the engine is rotating by inertia after the engine is stopped,
   wherein the pinion gear of the pinion unit is movable in the axial direction as a single body by having grooves for meshing engagement with a shaft core on an inner side of the pinion gear, and comprises a chamfered portion having a surface with a curved shape along a tooth surface on a non-torque transmitting surface side, the chamfered portion being provided between an end surface of the pinion gear on the ring gear side and the tooth surface on the non-torque transmitting surface side,
   wherein the curved shaped is formed as a curved shape which is a same shape as the tooth surface as viewed on a cross-section perpendicular to the axial direction,
   wherein the chamfered portion has a first length in the axial direction and a second length in a direction of rotation of the pinion gear which is perpendicular to the axial direction, and wherein the chamfered portion is provided to the pinion gear so that the first length in the axial direction is larger than the second length in the direction of rotation of the pinion gear,
   wherein a tooth of the pinion gear has an outer diameter surface located between the tooth surface on the non-torque transmitting surface side and a tooth surface located on the torque transmitting surface side, the outer diameter surface being a surface of the tooth located farthest toward the outer diameter than any other surface of the tooth,
   wherein the chamfered portion extends to the outer diameter surface.

2. The engine starting device according to claim 1, wherein the chamfered portion is provided so that a length of the non-torque transmitting surface in the axial direction is a minimum length such that the non-torque transmitting surface abuts against the ring gear in a state in which the pinion gear is in full meshing engagement with the ring gear.

3. The engine starting device according to claim 1, wherein the pinion gear further comprises a second chamfered portion along an outer diameter of a tooth tip, the second chamfered portion being provided to an outer diameter portion of the tooth tip of the pinion gear on the ring gear side.

4. The engine starting device according to claim 1, wherein the chamfered portion is formed by forging.

5. The engine starting device according to claim 1, wherein a second chamfered portion is provided on an outer diameter portion of a tooth tip, and the second chamfered portion and the chamfered portion contact each other at the outer diameter surface.

* * * * *